(12) United States Patent
Mukoyama et al.

(10) Patent No.: US 8,232,351 B2
(45) Date of Patent: Jul. 31, 2012

(54) HEAT SHRINKABLE POLYSTYRENE FILM AND PROCESS FOR PRODUCING THE SAME

(75) Inventors: Yukinobu Mukoyama, Ohtsu (JP); Shota Hayakawa, Ohtsu (JP); Naonobu Oda, Ohtsu (JP); Masayuki Haruta, Inuyama (JP); Katsuhiko Nose, Osaka (JP)

(73) Assignee: Toyo Boseki Kabushiki Kaisha, Osaka-shi (JP)

( * ) Notice: Subject to any disclaimer, the term of this patent is extended or adjusted under 35 U.S.C. 154(b) by 449 days.

(21) Appl. No.: 12/520,324

(22) PCT Filed: Dec. 19, 2007

(86) PCT No.: PCT/JP2007/074401
§ 371 (c)(1),
(2), (4) Date: Jun. 19, 2009

(87) PCT Pub. No.: WO2008/075707
PCT Pub. Date: Jun. 26, 2008

(65) Prior Publication Data
US 2010/0093938 A1    Apr. 15, 2010

(30) Foreign Application Priority Data

Dec. 20, 2006 (JP) ................................. 2006-343170
Dec. 6, 2007 (JP) ................................. 2007-315501

(51) Int. Cl.
*C08F 112/08* (2006.01)
*C08F 236/04* (2006.01)

(52) U.S. Cl. ........ 525/222; 525/232; 264/163; 526/346; 526/319; 526/340

(58) Field of Classification Search ................... 525/222, 525/232; 526/346, 319; 264/163
See application file for complete search history.

(56) References Cited

U.S. PATENT DOCUMENTS

| 5,322,664 | A | 6/1994 | Blackwelder |
| 6,413,596 | B1 | 7/2002 | Okuda et al. |
| 6,897,260 | B2 * | 5/2005 | Vynckier ............ 525/232 |

FOREIGN PATENT DOCUMENTS

| EP | 1 084 815 A1 | 3/2001 |
| JP | 60006414 A | 1/1985 |
| JP | 2003-094520 A | 4/2003 |
| JP | 2005-047959 A | 2/2005 |
| JP | 2005-067081 A | 3/2005 |

OTHER PUBLICATIONS

European Patent Office, Extended European Search Report for European Patent Application No. 07850871.0-2307 (Jun. 9, 2011).

* cited by examiner

*Primary Examiner* — Robert D. Harlan
(74) *Attorney, Agent, or Firm* — Leydig, Voit & Mayer, Ltd.

(57) ABSTRACT

The inventive heat-shrinkable polystyrene film is high in shrinkability in the longitudinal direction that is its main shrinkage direction, is excellent in perforated line openability, and has high toughness. The heat-shrinkable polystyrene film is characterized by particular values with respect to hot-water heat shrinkage ratio in the longitudinal and width directions, right angle tear strength in the width direction, and breaking energies in the longitudinal and width directions.

12 Claims, 1 Drawing Sheet

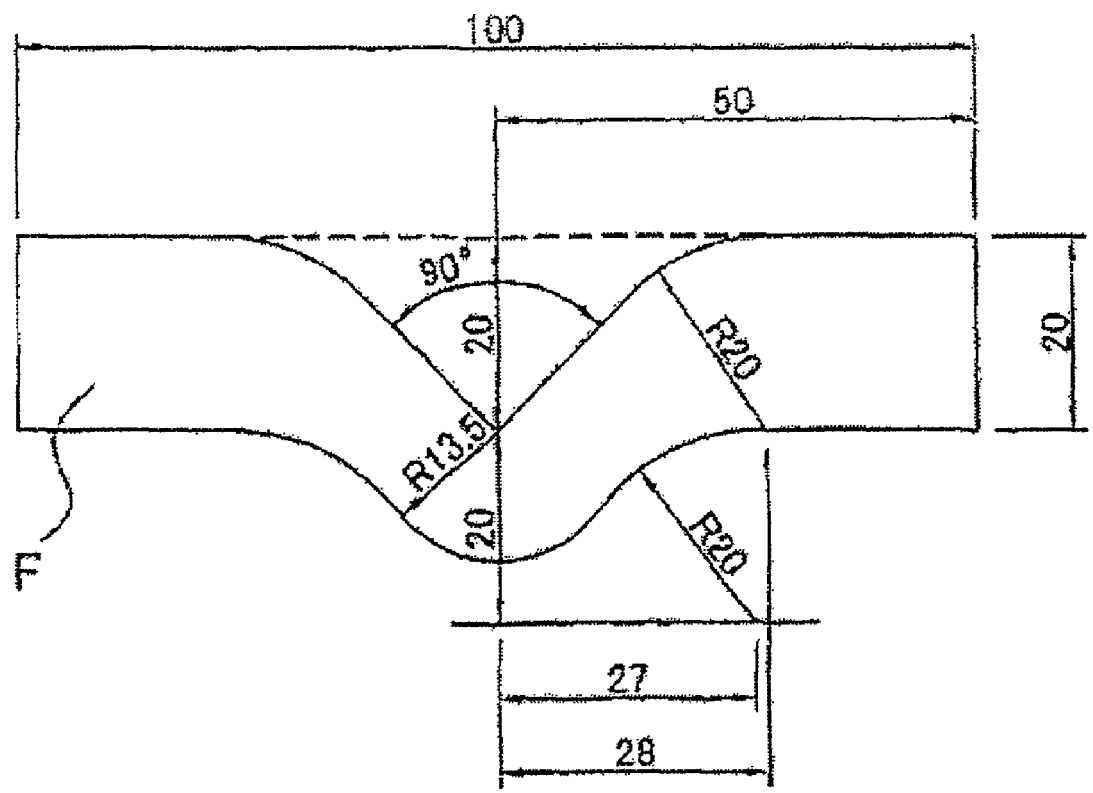

HEAT SHRINKABLE POLYSTYRENE FILM AND PROCESS FOR PRODUCING THE SAME

TECHNICAL FIELD

The present invention relates to a heat-shrinkable polystyrene film and a manufacturing method thereof, specifically to a heat-shrinkable polystyrene film suitable for label applications and a manufacturing method thereof.

BACKGROUND ART

Recently, heat-shrinkable plastic films made from a variety of resins are widely used for applications such as external packaging for improving the appearance of packaged goods, packaging for avoiding direct collision of contents, and label packaging for both of a protection of glass bottles or plastic bottles and indication of commercial products. Among these heat-shrinkable plastic films, stretched films made from polyvinyl chloride resin, polystyrene resin, polyester resin, or the like are used for the purpose of labeling, cap sealing or assembling packaging in various containers such as polyethylene terephthalate (PET) containers, polyethylene containers, and glass containers. However, although excellent in shrinkage characteristics, polyvinyl chloride films pose problems of, in addition to low heat resistance, generating a hydrogen chloride gas during incineration, generating dioxins, and the like.

Therefore, polystyrene films, which do not pose a problem of generating dioxins during incineration, have been widely utilized as shrinkable labels. The amount of use of polystyrene films tends to increase as the distribution amount of PET containers increases. Further, general heat-shrinkable polystyrene films that are stretched at a high ratio in the width direction and greatly shrunk in the width direction (namely, heat-shrinkable polystyrene films whose main shrinkage direction is the width direction) are widely utilized (Patent Document 1).

Patent Document 1: Japanese Unexamined Patent Publication No. 2003-94520

DISCLOSURE OF THE INVENTION

Problems to be Solved by the Invention

However, the aforementioned heat-shrinkable polystyrene films that are stretched in the width direction have toughness at a practical level, but the toughness of the films are insufficient as compared to that of polyester films and the like. When such a film is used as a label, there is the possibility that the label tears at a perforated line when a bottle on which the label is attached is dropped.

In addition, when a heat-shrinkable film that heat-shrinks in the width direction is attached as a label onto a bottle, a cylindrical body of the film should be formed such that the width direction of the film agrees with the circumferential direction of the bottle, should be attached onto the bottle by cutting the cylindrical body into pieces each having a predetermined length, and then should be heat-shrunk. Thus, it is difficult to attach a label, made from such a heat-shrinkable film, onto a bottle at a high speed. Further, in recent years, a wrapping method is developed that involves covering the circumference (opening) of a one side opened synthetic resin container, such as a lunch box, with a band-like film to keep the container enclosed. The aforementioned films that shrink in the width direction are unsuitable for such packaging applications.

An object of the present invention is to provide a heat-shrinkable polystyrene film that overcomes the problems of the above conventional heat-shrinkable polystyrene films, has excellent shrinkability in the longitudinal direction that is the main shrinkage direction, is attachable onto the circumference of a bottle directly from a film roll such that the main shrinkage direction agrees with the circumferential direction of the bottle, and is practical and suitable for the aforementioned novel wrapping applications.

Means for Solving the Problems

In the present invention, an invention described in claim 1 is a heat-shrinkable polystyrene film formed in an elongated shape with a constant width from a polystyrene resin, a main shrinkage direction thereof being in a longitudinal direction. The heat-shrinkable polystyrene film meets the following requirements (1) to (4):

(1) the hot-water heat shrinkage ratio in the longitudinal direction is 25% or more and 80% or less when the film is treated in hot water at 90° C. for 10 seconds;

(2) the hot-water heat shrinkage ratio in a width direction orthogonal to the longitudinal direction is −5% or more and 10% or less when the film is treated in hot water at 90° C. for 10 seconds;

(3) the right angle tear strength in the width direction per unit thickness after the film is shrunk by 10% in the longitudinal direction in hot water at 80° C. is 50 N/mm or more and 200 N/mm or less; and (4) each of the breaking energies in the longitudinal direction and the width direction is 1,000 Mpa·% or more and 10,000 Mpa·% or less when the film is kept at 30° C. for 2 weeks or longer and then a tensile test is performed at 23° C.

The breaking energy is a property value represented by the following Equation 1.

$$\text{Breaking energy [MPa·\%]} = \text{breaking strength [MPa]} \times \text{elongation at rupture [\%]} \quad \text{Equation 1}$$

An invention described in claim 2 is characterized in that in the invention described in claim 1, the polystyrene resin includes an atactic polystyrene as a principal component.

An invention described in claim 3 is characterized in that in the invention described in claim 1 or 2, wherein a material of the polystyrene resin is one obtained by copolymerization of: styrene that is a principal component; and at least one of a conjugated diene monomer, an acrylic ester, and a methacrylic ester.

An invention described in claim 4 is characterized in that in the invention described in claim 3, the copolymerization is random copolymerization.

An invention described in claim 5 is characterized in that in the invention described in claim 3, the copolymerization is block copolymerization.

An invention described in claim 6 is characterized in that in the invention described in claim 3, the copolymerization is graft copolymerization.

An invention described in claim 7 is a method for manufacturing a heat-shrinkable polystyrene film according to any one of claims 1 to 6. The method comprises the steps of: stretching an unstretched film at a ratio of 2.5 times or more and 6.0 times or less in the width direction at a temperature of Tg+5° C. or higher and Tg+40° C. or lower while holding both ends of the film in the width direction using clips within a tenter; heat-treating the film at a temperature of 100° C. or higher and 170° C. or lower for a period of 1.0 second or longer and 30.0 seconds or shorter; cutting and removing portions of the film at both ends in the width direction which are held by the clips; and stretching the film at a ratio of 1.5 times or more and 5.5 times or less in the longitudinal direction at a temperature of Tg+5° C. or higher and Tg+50° C. or lower.

Effect of the Invention

The heat-shrinkable polystyrene film of the present invention has high shrinkability in the longitudinal direction that is its main shrinkage direction, and is excellent in perforated line openability and toughness. In addition, the heat-shrinkable polystyrene film is more excellent in tear properties (perforated line openability) when being torn along a perforated line orthogonal to the main shrinkage direction, than conventional heat-shrinkable polystyrene films. Thus, the heat-shrinkable polystyrene film of the present invention can be suitably used as a label of a container such as a bottle, is attachable onto a container such as a bottle very efficiently within a short time, and can show a good finish with extremely few wrinkles and insufficient shrinkages when heat-shrunk after attachment. In addition, the attached label exhibits excellent toughness and extremely excellent perforated line openability.

Further, according to the method for manufacturing a heat-shrinkable polystyrene film of the present invention, a heat-shrinkable polystyrene film, which has high shrinkability in the longitudinal direction that is the main shrinkage direction and is excellent in perforated line openability and toughness, can be manufactured easily at a low cost.

BEST MODE FOR CARRYING OUT THE INVENTION

As a polystyrene resin used in the present invention, a copolymer of a styrene hydrocarbon and a conjugated diene hydrocarbon; the mixture of two or more types of the above copolymers having different styrene contents; a copolymer of the above copolymer and a monomer that is capable of copolymerizing with a styrene hydrocarbon or a conjugated diene hydrocarbon; or the mixture thereof can be used. Among them, a copolymer of a styrene hydrocarbon and a conjugated diene hydrocarbon is preferably used.

Examples of the styrene hydrocarbon include alkylstyrene such as styrene, p-, m- or o-methylstyrene, 2,4-,2,5-,3,4-, or 3,5-dimethylstyrene, p-t-butylstyrene, and the like; halogenated styrene such as o-, m-, or p-chlorostyrene, o-, m-, or p-bromostyrene, o-, m-, or p-fluorostyrene, o-methyl-p-fluorostyrene, and the like; halogenated alkyl-substituted styrene such as o-, m-, or p-chloromethylstyrene and the like; alkoxystyrene such as p-, m-, or o-methoxystyrene, o-, m-, or p-ethoxystyrene, and the like; carboxyalkylstyrene such as o-, m-, or p-carboxymethylstyrene, and the like; alkyletherstyrene such as p-vinylbenzylpropylether and the like; alkylsilylstyrene such as p-trimethylsilylstyrene and the like; and vinylbenzyldimethoxyphosphide. The styrene hydrocarbon may be constituted of one or more of them. These styrene hydrocarbons preferably have an atactic structure.

Examples of the conjugated diene hydrocarbon include butadiene, isoprene, 2-methyl-1,3-butadiene, 2,3-dimethyl-1,3-butadiene, 1,3-pentadiene, 1,3-hexadiene, and the like. The conjugated diene hydrocarbon may be constituted of one or more of them.

Examples of the monomer that is capable of copolymerizing with a styrene hydrocarbon include aliphatic unsaturated carboxylic esters such as methyl (meth)acrylate, butyl (meth)acrylate, 2-ethylhexyl (meth)acrylate, lauryl (meth)acrylate, lauryl (meth)acrylate, stearyl (meth)acrylate, and the like.

Among them, a copolymer of styrene and butyl (meth)acrylate is preferably used, and among them, a copolymer whose styrene content is 40 mass % or more and 90 mass % or less, whose Tg (peak temperature of loss elastic modulus E") is 50° C. or higher and 90° C. or lower, whose melt flow rate (MFR) measurement value (measurement conditions: a temperature of 200° C., a load of 49N) is 2 g/10 min or more and 15 g/10 min or less, is more preferably used. The above (meth)acrylate indicates acrylate and/or methacrylate.

Examples of the monomer that is capable of copolymerizing with the conjugated diene hydrocarbon include acrylonitrile and the like.

One of copolymers of a styrene hydrocarbon and a conjugated diene hydrocarbon, which is preferably used, is a styrene-butadiene copolymer (SBS) in which the styrene hydrocarbon is styrene and the conjugated diene hydrocarbon is butadiene. The styrene content of the SBS is 40 mass % or more, preferably 45 mass % or more, and more preferably 50 mass % or more. The upper limit of the styrene content is 95 mass %, preferably 90 mass %, and more preferably 85 mass %. When the styrene content is 60 mass % or more, the effect of impact resistance is provided. When the upper limit of the styrene content is 95 mass %, the coefficient of elasticity of a film at about room temperature can be maintained and the film can be excellent in toughness. When a styrene-conjugated diene copolymer, a styrene-acrylic ester copolymer, or a styrene-methacrylic ester copolymer is used as a styrene resin, a copolymerization form is not particularly limited, and may be any type of a block copolymer, a random copolymer, a copolymer with a tapered block structure or a graft structure. However, a block copolymer is preferable. In light of cost, a random copolymer and a graft type copolymer are preferably used.

Examples of marketed products of the above SBS resin include "Clearen" (manufactured by Denki Kagaku Kogyo Kabushiki Kaisha), "Asaflex" (manufactured by Asahi Kasei Chemicals Corporation), "Styroflex" (manufactured by BASF Japan Ltd.), "K-resin" (manufactured by Chevron Philips Chemical Company LLC), and the like.

Further, the above styrene resin may be used only one of the above styrene resins, or two of the above styrene resins with different styrene contents. In addition, the styrene resin may consist of a mixture of: a copolymer of a styrene hydrocarbon and a conjugated diene hydrocarbon; and a copolymer of the copolymer and a monomer that is capable of copolymerizing with a styrene hydrocarbon or a conjugated diene hydrocarbon.

The weight (mass) average molecular weight (Mw) of the above styrene resin is 100,000 or more and preferably 150,000 or more, and its upper limit is 500,000 or less, preferably 400,000 or less, and more preferably 300,000 or less. When the weight (mass) average molecular weight (Mw) of the styrene resin is 100,000 or more, there is no drawback that causes deterioration of the film, which is preferred. When the weight (mass) average molecular weight (Mw) of the styrene resin is 500,000 or less, it is not necessary to adjust flow property and there is no drawback of deterioration of extrusion property and the like, which is preferred.

The melt flow rate (MFR) measurement value (measurement condition is: a temperature of 200° C., a load of 49N) of the above styrene resin is 2 g/10 min or more and preferably 3 g/10 min or more, and its upper limit is 15 g/10 min or less, preferably 10 g/10 min or less, and more preferably 8 g/10 min or less. When the MFR is 2 g/10 min or more, an appropriate flow viscosity is obtained during extrusion molding, and thus the productivity can be maintained or improved. In addition, when the MFR is 15 g/10 min or less, appropriate cohesion of the resin is obtained, and thus excellent toughness and elasticity of the film can be obtained and the film can become difficult to embrittle.

Further, when the heat-shrinkable polystyrene film of the present invention is treated in hot water at 90° C. for 10 seconds in an unloaded state, the heat shrinkage ratio (i.e., hot-water heat shrinkage ratio at 90° C.) of the film in the longitudinal direction, which is calculated by the following Equation 2 from the lengths before and after shrinkage, needs to be 25% or more and 80% or less.

Heat shrinkage ratio={(length before shrinkage−length after shrinkage)/length before shrinkage}× 100(%)   Equation 2

When the hot-water heat shrinkage ratio in the longitudinal direction at 90° C. is less than 25%, the amount of shrinkage is small. Thus, wrinkles and sags occur in the label after heat shrinkage, which is not preferred. The lower limit of the hot-water heat shrinkage ratio in the longitudinal direction at 90° C. is preferably 30% or more, more preferably 35% or more, and particularly preferably 40% or more. In light of the essential properties of a polystyrene resin that is a raw material, the upper limit of the hot-water heat shrinkage ratio in the longitudinal direction at 90° C. is thought to be about 80%.

Further, when the heat-shrinkable polystyrene film of the present invention is treated in hot water at 90° C. for 10 seconds in an unloaded state, the heat shrinkage ratio of the film in the width direction, which is calculated by the above Equation 2 from the lengths before and after shrinkage, needs to be −5% or more and 10% or less. It is noted that a negative ratio of the hot-water heat shrinkage means extension of the film.

When the hot-water heat shrinkage ratio in the width direction at 90° C. is −5% or less (for example, −7%), a good shrinkage appearance cannot be obtained when the film is used as a label of a bottle, which is not preferred. On the other hand, when the hot-water heat shrinkage ratio at 90° C. exceeds 10%, distortion in shrinkage is liable to occur during heat shrinkage when the film is used as a label, which is not preferred. The lower limit of the hot-water heat shrinkage ratio in the width direction at 90° C. is preferably −3% or more, and most preferably 0%. The upper limit of the hot-water heat shrinkage ratio in the width direction at 90° C. is preferably 8% or less, more preferably 6% or less, and particularly preferably 4% or less.

Further, when the heat-shrinkable polystyrene film of the present invention is shrunk by 10% in hot water at 80° C. in the longitudinal direction and then the right angle tear strength in the width direction per unit thickness is evaluated by the following method, its right angle tear strength in the width direction needs to be 50 N/mm or more and 200 N/mm or less.

[Method of Measuring Right Angle Tear Strength]

The film is attached to a rectangular frame having a predetermined length in a preliminarily loosened state (i.e., both ends of the film are held by the frame). Then, the film is shrunk by 10% in the longitudinal direction by being immersed in hot water at 80° C. for about 5 seconds until the loosened film comes into a state of tension in the frame (until the sag is removed). Then, the film is sampled as a test piece of a predetermined size according to JIS-K-7128. Thereafter, both ends of the test piece are gripped with a universal tensile strength tester and then the strength at the tensile fracture in the width direction of the film is measured at a tension rate of 200 mm/minute. Then, the right angle tear strength per unit thickness is calculated by using the following Equation 3.

Right angle tear strength=strength at tensile fracture÷thickness   Equation 3

When the right angle tear strength after the film is shrunk by 10% in hot water at 80° C. in the longitudinal direction is less than 50 N/mm, there is the possibility that the film is easily torn by an impact due to falling during transportation when the film is used as a label, which is not preferred. On the other hand, when the right angle tear strength exceeds 200 N/mm, cuttability (easiness to tear) in an initial stage when the label is torn becomes defective, which is not preferred. The lower limit of the right angle tear strength is preferably 70 N/mm or more, more preferably 90 N/mm or more, and particularly preferably 110 N/mm or more. The upper limit of the right angle tear strength is preferably 180 N/mm or less, more preferably 160 N/mm or less, and particularly preferably 140 N/mm or less.

Regarding cuttability when a label is torn along a perforated line, it is thought that easiness to tear (easiness to put a notch) at the first portion (part of the upper or lower end of the label) of the perforated line as described above; and easiness to tear along the perforated line with a small force to the other end without tearing the label in a oblique direction with respect to the perforated line and cutting a tab (the balance between easinesses to tear in the perforated line direction and in the direction orthogonal to the perforated line direction), contribute to easiness of a work operation of actually manually peeling off the label. The latter easiness can slightly improve by modification of the pitch of the perforated line, and the like. The former easiness, which is the easiness to tear at the first portion of the perforated line, well corresponds to sensory evaluation when the label is actually manually torn, and is thought to be more important property. Therefore, the right angle tear strength of the heat-shrinkable polystyrene film of the present invention needs to be in the above range. However, the latter easiness, namely, the balance between easinesses to tear in the perforated line direction and in the direction orthogonal to the perforated line direction is preferably caused to be in a specific range because the perforated line openability of the heat-shrinkable polystyrene film of the present invention can improve. Specifically, when the heat-shrinkable polystyrene film of the present invention is shrunk by 10% in hot water at 80° C. in the longitudinal direction and then the Elmendorf tear loads in the longitudinal direction and the width direction are evaluated by the following method, the Elmendorf ratio that is the ratio of these Elmendorf tear loads is preferably 0.35 or more and 1.5 or less.

[Method of Measuring Elmendorf Ratio]

The film is attached to a rectangular frame having a predetermined length in a preliminarily loosened state (i.e., both ends of the film are held by the frame). Then, the film is shrunk by 10% in the longitudinal direction by being immersed in hot water at 80° C. for about 5 seconds until the loosened film comes into a state of tension in the frame (until the sag is removed). Thereafter, the Elmendorf tear loads in the longitudinal direction and the width direction of the film are measured according to JIS-K-7128 and then the Elmendorf ratio is calculated using the following Equation 4.

Elmendorf ratio=Elmendorf tear load in the longitudinal direction÷Elmendorf tear load in the width direction   Equation 4

When the Elmendorf ratio is less than 0.35, the film is not easy to tear straight along the perforated line when used as a label, which is not preferred. On the other hand, when the Elmendorf ratio exceeds 1.5, the label is easy to tear at a position shifted from the perforated line, which is not preferred. The lower limit of the Elmendorf ratio is preferably 0.40 or more, more preferably 0.45 or more, and particularly preferably 0.50 or more. The upper limit of the Elmendorf ratio is preferably 1.4 or less, more preferably 1.3 or less, and particularly preferably 1.2 or less.

Further, when the heat-shrinkable polystyrene film of the present invention is kept at 30° C. for 2 weeks or longer and then a tensile test is performed at 23° C., each of the breaking energies (calculated by the above Equation 1) in the longitudinal and width directions needs to be 1,000 MPa·% or more and 10,000 MPa·% or less.

The breaking energy is a property value represented by the above Equation 1, and is thought to be an indicator for toughness of the film. The breaking energy is though to need to be increased in order to provide excellent tear resistance and break resistance with respect to deformation caused by stretching (e.g. tension to the film during printing) during processing and an impact to a label (when a bottle is dropped) after shrinkage packaging. When the breaking energy is less than 1,000 MPa·%, the film is easy to embrittle due to aging (aging caused by keeping the film during distribution until consumed as a product), which is not preferred. The lower limit of the breaking energy is preferably 1,500 MPa·% or more and more preferably 2,000 MPa·% or more. It is more preferable if the breaking energy is greater, but, in light of the properties of polystyrene that is a raw material, the upper limit of the breaking energy is thought to be about 10,000 MPa·%.

In the present invention, the maximum value of the heat shrinkage stress in the longitudinal direction of the film is preferably 3.0 (MPa) or more. When the maximum value of the heat shrinkage stress in the longitudinal direction of the film is less than 3.0 (MPa), if the film is attached as a label onto a container such as a PET bottle and heat-shrunk, the label rotates in conjunction with the cap when the cap of the PET bottle is opened, thereby deteriorating the openability of the cap, which is not preferred. The maximum value of the heat shrinkage stress in the longitudinal direction of the film is preferably 4.0 (MPa) or more and particularly preferably 5.0 (MPa) or more. In light of the properties of polystyrene that is a raw material, the upper limit of the maximum value of the heat shrinkage stress is thought to be about 10 (MPa).

The above heat shrinkage ratio, the right angle tear strength, the Elmendorf ratio, the breaking energy of the heat-shrinkable film can be attained by using the aforementioned preferred film composition in combination with a later-described preferred manufacturing method.

The thickness of the heat-shrinkable polystyrene film of the present invention is not particularly limited to a specific value, but is preferably in a range from 10 to 200 μm and more preferably in a range from 20 to 100 μm, as a heat-shrinkable film for labels.

The heat-shrinkable polystyrene film of the present invention can be obtained by melt-extruding the aforementioned polystyrene material by an extruder to form an unstretched film and then biaxially stretching and heat-treating the unstretched film by the following methods.

When a raw material resin is melt-extruded, a polystyrene material is preferably dried using a dryer such as a hopper dryer or a paddle dryer or using a vacuum dryer. After the polystyrene material is dried in such a manner, the material is molten at a temperature of 200 to 300° C. and extruded in a film form using an extruder. Upon such extrusion, an existing arbitrary method such as a T-die method or a tubular method can be used.

Then, an unstretched film can be obtained by quenching the sheet-like molten resin after extrusion. As the method of quenching a molten resin, a method of casting a molten resin onto a revolving drum from a head and quenching and solidifying the resin to obtain a substantially unoriented resin sheet can be suitably used.

In addition, the resulting unstretched film is stretched in the width direction under predetermined conditions, as described below. Thereafter, a thermal relaxation treatment is once performed for the film, and then the film is stretched in the longitudinal direction under predetermined conditions. The heat-shrinkable polystyrene film of the present invention can be obtained by cooling the film after the longitudinal stretching. The following will describe in detail a preferred biaxial stretching method for obtaining the heat-shrinkable polystyrene film of the present invention, in consideration of the difference between the methods of the present invention and the conventional biaxial stretching method for a heat-shrinkable polystyrene film.

[Preferred Film-Forming Method for Heat-shrinkable Polystyrene Film]

As described above, a heat-shrinkable film stretched simply in the width direction has toughness at a practical level, but the toughness is insufficient as compared to that of polyester films and the like. On the other hand, demands for heat-shrinkable films that shrink in the longitudinal direction have been high so far. However, a wide film cannot be manufactured only by stretching an unstretched film in the longitudinal direction. Thus, the productivity is poor and a film with a good thickness unevenness cannot be manufactured. Further, use of a method for stretching a film in the width direction simply and then stretching the film in the longitudinal direction produces a film in which the amount of shrinkage in the longitudinal direction is insufficient or a film that needlessly shrinks in the width direction.

The present inventors have diligently studied, in the method of stretching a film in the width direction and then stretching the film in the longitudinal direction (hereinafter, referred to as the transverse-lengthwise stretching method), how the hot-water shrinkage ratio in the longitudinal direction and the toughness of the film are changed depending on conditions in each stretching process. As a result, the present inventors have found that, during the manufacture of a film by the transverse-lengthwise stretching method, the amount of shrinkage in the longitudinal direction can be increased and the film with excellent toughness can be stably manufactured by applying the following techniques. In addition, it has been found that the perforated line openability in the direction orthogonal to the main shrinkage direction is improved more as compared to that of the conventional films. The present inventors have come to contrive the present invention on the basis of these findings.

(1) Intermediate thermal relaxation treatment after stretching in the width direction
(2) Trimming of the film edge prior to stretching in the longitudinal direction The following will sequentially describe the above techniques.

(1) Intermediate Thermal Relaxation Treatment After Stretching in Width Direction.

The manufacturing of a film according to the transverse-lengthwise stretching method of the present invention requires stretching an unstretched film in the width direction and then performing a thermal relaxation treatment (hereinafter, referred to as the intermediate thermal relaxation treatment) for the film at a temperature of 100° C. to 170° C. for a period of 1.0 to 30.0 seconds. Conduct of such an intermediate thermal relaxation treatment makes it possible to obtain a film that has excellent perforated line cuttability and excellent toughness and does not generate shrinkage unevenness when the film is made into a label. The reason why a film that has excellent perforated line cuttability and excellent toughness and does not generate shrinkage unevenness can be obtained by conducting a specific intermediate thermal relaxation treatment after transverse stretching in such a manner is not clear. However, this is thought to be because the shrinkage stress in the width direction can be decreased while the molecular orientation in the width direction is made to remain to some extent by applying the specific intermediate thermal relaxation treatment.

Further, when the intermediate thermal relaxation treatment is not performed or the temperature for the intermediate thermal relaxation treatment is lower than 100° C., the decrease of the width during lengthwise stretching is marked and a film with excellent flatness cannot be obtained, which is not preferred. The lower limit of the thermal relaxation treatment temperature is preferably 110° C. or higher and more preferably 115° C. or higher. The upper limit of the thermal relaxation treatment temperature is preferably 165° C. or lower and more preferably 160° C. or lower. On the other hand, the time period for the thermal relaxation treatment needs to be controlled within the range from 1.0 to 30.0 seconds depending on the material composition.

The stretching in the width direction of an unstretched film needs to be executed while the both ends of the film in the width direction are held by clips in a tenter such that the temperature is Tg+5° C. or higher and Tg+40° C. or lower and the stretching ratio is 2.5 times or more and 6.0 times or less. When the stretching temperature falls below Tg+5° C., rupture is liable to occur during stretching, which is not preferred. On the other hand, when the temperature exceeds Tg+40° C., the thickness evenness in the width direction deteriorates, which is not preferred. The lower limit of the transverse stretching temperature is preferably Tg+10° C. or higher and more preferably Tg+15° C. or higher. The upper limit of the transverse stretching temperature is preferably Tg+35° C. or lower and more preferably Tg+30° C. or lower. When the stretching ratio in the width direction falls below 2.5 times, not only the productivity is poor but also the thickness evenness in the width direction deteriorates, which is not preferred. On the other hand, when the stretching ratio exceeds 6.0 times, rupture is liable to occur during stretching and also a large energy and a large scale device are required for thermal relaxation, and thus the productivity deteriorates, which is not preferred. In addition, the lower limit of the transverse stretching ratio is preferably 3.0 times or more and more preferably 3.5 times or more. The upper limit of the transverse stretching ratio is 5.5 times or less and more preferably 5.0 times or less.

(2) Trimming of Film Edge Prior to Stretching in Longitudinal Direction.

In the manufacture of a film by the transverse-lengthwise stretching method of the present invention, before the film having been subjected to the intermediate thermal relaxation treatment is stretched in the longitudinal direction, a thick portion (mainly, a clip gripping portion during transverse stretching) of the film at the film edge that has not been sufficiently and transversely stretched needs to be trimmed. Specifically, thick portions, located on right and left edges of the film, with a thickness of about 1.1 to 1.3 times that of the central portion need to be cut and removed using a tool such as a cutter, and only the remaining portion needs to be stretched in the longitudinal direction. When the film edge is trimmed as described above, a film before being subjected to trimming is preferably cooled in advance such that the surface temperature of the film is 50° C. or lower. Cooling the film in such a manner makes it possible to trim the film without leaving a rough cut surface. Moreover, although the film edge can be trimmed using a usual cutter or the like, use of a round blade having a circular cutting edge permits the film edge to be sharply and continuously cut over a long period of time without partially dulling the cutting edge. This causes no induction of rupture during stretching in the longitudinal direction and thus is preferable.

Trimming of the film edge prior to stretching in the longitudinal direction in such a way makes it possible to uniformly stretch a film, which has been once subjected to thermal fixation, in the longitudinal direction. Now, for the first time, a continuous stable production of a film without rupture becomes possible. Additionally, it becomes possible to obtain a film with a large amount of shrinkage in the longitudinal direction (main shrinkage direction). Furthermore, uniform stretching of a film in the longitudinal direction is possible, so that a film having a small thickness unevenness in the longitudinal direction can be obtained. In addition, the trimming of the film edge allows bowing during stretching in the longitudinal direction to be avoided, thereby obtaining a film exhibiting a small physical property difference between its right and left portions.

It is thought that only one of the techniques (1) and (2) described above does not effectively contribute to the heat shrinkability in the longitudinal direction, the perforated line openability, the toughness, and the stable film formability of the film, and the use of the combination of the techniques (1) and (2) makes it possible to very effectively exhibit excellent heat shrinkability in the longitudinal direction, excellent perforated line openability, excellent toughness, and excellent stable film formability of the film.

EXAMPLES

Hereinafter, the present invention will be described in more detail by way of examples; however, the invention is by no means limited to aspects of such examples and can be properly modified within the invention. The properties and compositions of materials used in Examples and Comparative Examples, and the manufacturing conditions of the films (stretching and thermal treatment conditions and the like) in Examples and Comparative Examples are each shown in Tables 1 and 2. The polystyrenes used in Examples and Comparative Examples are as follows.

Polystyrene 1: a graft-type copolymerized polystyrene (MFR: 3.5 g/10 min) that consists of 45 mol % of styrene, 21 mol % of butadiene, 21 mol % of butyl acrylate, and 13 mol % of methyl methacrylate, and whose styrene part has an atactic structure.

Polystyrene 2: a graft-type copolymerized polystyrene (MFR: 3.5 g/10 min) that consists of 50 mol % of styrene, 25 mol % of butadiene, 20 mol % of butyl acrylate, and 5 mol % of methyl methacrylate, and whose styrene part has an atactic structure.

TABLE 1

| | Composition of resin material (mol %) |
|---|---|
| Example 1 | Styrene:Butadiene:Butyl acrylate:Methyl methacrylate = 45:21:21:13 |
| Example 2 | Styrene:Butadiene:Butyl acrylate:Methyl methacrylate = 50:25:20:5 |
| Example 3 | Styrene:Butadiene:Butyl acrylate:Methyl methacrylate = 45:21:21:13 |
| Example 4 | Styrene:Butadiene:Butyl acrylate:Methyl methacrylate = 45:21:21:13 |

TABLE 1-continued

| | Composition of resin material (mol %) |
|---|---|
| Example 5 | Styrene:Butadiene:Butyl acrylate:Methyl methacrylate = 45:21:21:13 |
| Example 6 | Styrene:Butadiene:Butyl acrylate:Methyl methacrylate = 45:21:21:13 |
| Comparative Example 1 | Styrene:Butadiene:Butyl acrylate:Methyl methacrylate = 45:21:21:13 |
| Comparative Example 2 | Styrene:Butadiene:Butyl acrylate:Methyl methacrylate = 45:21:21:13 |
| Comparative Example 3 | Styrene:Butadiene:Butyl acrylate:Methyl methacrylate = 45:21:21:13 |
| Comparative Example 4 | Styrene:Butadiene:Butyl acrylate:Methyl methacrylate = 45:21:21:13 |
| Comparative Example 5 | Styrene:Butadiene:Butyl acrylate:Methyl methacrylate = 45:21:21:13 |

TABLE 2

| | Stretching conditions | | | | | |
|---|---|---|---|---|---|---|
| | | Transverse stretching | | Intermediate thermal relaxation treatment (thermal treatment after uniaxial stretching) | | Lengthwise stretching | |
| | Stretching method | Temperature (° C.) | Ratio | Temperature (° C.) | Time (sec) | Temperature (° C.) | Ratio |
| Example 1 | Transverse-Lengthwise | 82 | 4.0 | 120 | 12 | 95 | 3.0 |
| Example 2 | Transverse-Lengthwise | 82 | 4.0 | 120 | 12 | 95 | 3.0 |
| Example 3 | Transverse-Lengthwise | 82 | 5.0 | 120 | 12 | 95 | 3.0 |
| Example 4 | Transverse-Lengthwise | 82 | 4.0 | 130 | 12 | 95 | 3.0 |
| Example 5 | Transverse-Lengthwise | 82 | 4.0 | 120 | 12 | 95 | 2.3 |
| Example 6 | Transverse-Lengthwise | 82 | 4.0 | 120 | 12 | 95 | 1.8 |
| Comparative Example 1 | Lengthwise | 95 | 4.0 | Not performed | Not performed | Not performed | Not performed |
| Comparative Example 2 | Transverse-Lengthwise | 82 | 4.0 | Not performed | Not performed | 95 | 3.0 |
| Comparative Example 3 | Transverse-Lengthwise | 82 | 4.0 | 120 | 12 | 95 | 1.2 |
| Comparative Example 4 | Transverse-Lengthwise | 82 | 4.0 | 80 | 12 | 95 | 3.0 |
| Comparative Example 5 | Transverse-Lengthwise | 82 | 2.0 | 120 | 12 | 95 | 3.0 |

The evaluation methods of films are as follows.

[Tg (Glass Transition Point)]

Tg was obtained from the resulting endothermic curve by heating 5 mg of an unstretched film from −40° C. to 120° C. at a temperature rising rate of 10° C./minute using a differential scanning calorimeter (Model: DSC 220) manufactured by Seiko Instruments Inc. A tangent line was drawn in front of and behind the inflection point of the endothermic curve, and the intersection was taken as Tg (glass transition point).

[Tm (Melting Point)]

Tm was obtained from the peak temperature of an endothermic curve when 5 mg of an unstretched film was collected and heated from room temperature at a temperature rising rate of 10° C./minute using a differential scanning calorimeter manufactured by Seiko Instruments Inc. (Model: DSC 220).

[Heat Shrinkage Ratio (Hot-water Heat Shrinkage Ratio)]

A film was cut into a square of 10 cm×10 cm, and treated and heat-shrunk in hot water at a predetermined temperature (80° C., 90° C.) of ±0.5° C. for 10 seconds in an unloaded state. Thereafter, the dimensions of the film in the lengthwise and transverse directions were measured and then each heat shrinkage ratio was calculated according to the above Equation 2. The direction in which the heat shrinkage ratio is larger was taken as the main shrinkage direction.

[Maximum Value of Heat Shrinkage Stress]

The stretched film was cut into a size where the main shrinkage direction×the direction orthogonal to the main shrinkage direction=200 mm×15 mm. Thereafter, a universal tensile strength tester (autograph manufactured by Shimadzu Corporation) was adjusted to a temperature of 90° C. and the cut film was set therein and then the maximum stress value when the film was held for 60 seconds was determined.

[Right Angle Tear Strength]

A film was shrunk by 10% in the main shrinkage direction in hot water adjusted to 80° C. Thereafter, a test piece was made by sampling the film into a shape shown in FIG. 1 according to JIS-K-7128 (in sampling, the longitudinal direction of the test piece was taken as the main shrinkage direction of the film). Thereafter, both ends of the test piece were gripped with a universal tensile strength tester (autograph manufactured by Shimadzu Corporation), the strength at the tensile fracture in the width direction of the film was measured at a tensile rate of 200 mm/minute, and then the right angle tear strength per unit thickness was calculated using the above Equation 3.

[Elmendorf Ratio]

The resulting film was attached to a rectangular frame while having been loosened in advance (both ends of the film were held by the frame). Then, the film was shrunk by 10% in the main shrinkage direction (hereinafter, referred to as preliminary shrinkage) by being immersed in hot water at 80° C. for about 5 seconds until the loosened film comes into a state of tension in the frame (until the sag is removed). Thereafter, according to JIS-K-7128, the film was cut into a size where main shrinkage direction×orthogonal direction=63 mm×75 mm and a test piece was prepared by making a slit of 20 mm (depth of cut) at the center of a long edge (edge along the orthogonal direction) so as to be orthogonal to the edge. Then, the Elmendorf tear load in the main shrinkage direction was measured using the test piece fabricated. In addition, the film was preliminarily shrunk in the main shrinkage direction by the same method as above. Thereafter, a test piece was prepared such that the main shrinkage direction of the film and the orthogonal direction of the film were interchanged, and the Elmendorf tear load in the orthogonal direction was measured. Then, the Elmendorf ratio was calculated by using the above Equation 4 from the resulting Elmendorf tear loads in the main shrinkage direction and the direction orthogonal to the main shrinkage direction.

[Breaking Energy]

A film was kept at 30° C. for 2 weeks, and then was sampled as a test piece with a width of 10 mm and a length of 150 mm. The tensile breaking strength and the elongation at rupture in each of the main shrinkage direction and the orthogonal direction were measured according to JIS-K7127 with an initial length of 40 mm and at a tensile rate of 200 mm/minute using an autograph manufactured by Shimadzu Corporation, and the breaking energy was calculated by the above Equation 1.

[Finish Properties after Shrinkage]

The resulting film roll was slit with a width of about 200 mm, cut with a predetermined length, and wound to produce small-size slit rolls. Printing for labels (three-color printing) was repeatedly applied in advance to the slit rolls with dark green, gold and white inks manufactured by Toyo Ink Mfg. Co., Ltd. In each portion printed for a label, two perforated lines (in which circles with a diameter of about 1 mm were arranged at intervals of about 2 mm) are formed across the entire film width at an interval of about 22 mm in the direction orthogonal to the longitudinal direction of the film roll. An end of the rolled film that has been subjected to printing for labels was bonded to a part of the outer circumference of a 500 ml PET bottle (body diameter: 62 mm, minimum diameter of the neck portion: 25 mm) by putting the end on an adhesive applied to the part of the outer circumference of the bottle. In this state, the roll film was drawn for a predetermined length, and wound around the outer circumference of the PET bottle. Thereafter, portions of the heat-shrinkable film that overlapped with each other on the outer circumference of the PET bottle were bonded to each other by the adhesive, and the outer film was cut by a cutter in the vertical direction, thereby covering the outer circumference of the PET bottle with a label. The attaching of the label was completed by passing the PET bottle covered with the label through a steam tunnel (model: SH-1500-L), manufactured by Fuji Astec Inc., for 2.5 seconds at a zone temperature of 80° C. to heat-shrink the label around the outer circumference of the 500 ml PET bottle. Upon attachment, in the neck portion, a portion with a diameter of 40 mm was adjusted so as to become one end of the label. Finish properties after shrinkage were visually evaluated, and the criteria were as follows.

Excellent: No wrinkles, jumping up, and insufficient shrinkage occurred and no colored spots were seen as well.

Good: No wrinkles, jumping up, or insufficient shrinkage were confirmed, but some colored spots were seen.

Fair: No jumping up and insufficient shrinkage occurred, but unevenness in the neck portion was seen.

Poor: Wrinkles, jumping up, and insufficient shrinkage occurred.

[Perforated Line Openability]

A label provided in advance with a perforated line in the direction orthogonal to the main shrinkage direction was attached onto a PET bottle under the same conditions as the measurement conditions of the finish properties after shrinkage as described above. Here, the two perforated lines were formed by punching holes with a length of 1 mm at intervals of 2 mm, and provided at an interval of 22 mm and for a length of 120 mm in the vertical direction (direction of height) of the label. Thereafter, this bottle was filled with 500 ml of water and refrigerated at 5° C., and then the perforated line of the label of the bottle immediately after being taken out from the refrigerator was torn with the tips of fingers. The number of bottles of which the labels were successfully torn along the perforated lines in the vertical direction and peeled off the bottles was counted. The ratio (%) of the number of bottles to the total sample number of 50 was calculated.

[Toughness (Strength Upon Drop)]

A PET bottle onto which a label was attached similarly as in the above evaluation of finish properties after shrinkage was dropped from a height of 1 m such that the bottle bottom collided against a floor, and the tear of the label was visually evaluated. A bottle in which a tear occurred in its label was evaluated as defective, a label for which the rate of defective number out of 10 PET bottles was 30% or less and in which a tear was unlikely to occur was evaluated to have good toughness, and a label for which the defective rate was 40% or more and in which a tear was likely to occur was evaluated to have poor toughness.

Example 1

The above polystyrene 1 was put into an extruder, melt at 220° C., extruded from a T-die, and wound around a rotating metal roll cooled at a surface temperature of 30° C. so as to be quenched, resulting in an unstretched film with a thickness of 360 μm. The take-off speed (rotational speed of the metal roll) of the unstretched film at this time was about 20 m/min. In addition, Tg of the unstretched film was 72° C. Thereafter, the resulting unstretched film was led to a tenter (first tenter) in which a transverse stretching zone, an intermediate zone, and an intermediate thermal relaxation treatment zone were continuously disposed. In the tenter, the length of the intermediate zone located intermediately between the transverse stretching zone and the intermediate thermal relaxation treatment zone was set at about 40 cm. Additionally, in the intermediate zone, when a strip of paper was hung down in a state where a film did not pass therethrough, hot air from the stretching zone and hot air from the thermal treatment zone were interrupted such that the paper strip hung down almost completely in the lengthwise direction.

Then, the unstretched film led to the tenter was preliminarily heated (set temperature: 90° C.). Thereafter, the film was stretched to 4 times its original length at 82° C. in the transverse direction in the transverse stretching zone and passed through the intermediate zone. Then, the film was led to the intermediate thermal relaxation treatment zone and heat-treated at a temperature of 120° C. for 12 seconds, resulting in a transverse uniaxially stretched film with a thickness of 90 μm. Subsequently, one pair of trimming devices (including a round blade having a circular cutting edge) disposed on right and left sides behind the tenter were utilized to cut an edge area of the transverse uniaxially stretched film (portion with a thickness of about 1.2 times that of the center of the film) and to continuously remove the edge portions of the film positioned outside the cut portion.

Furthermore, the film whose edges were trimmed in such a manner was led to a lengthwise stretching machine in which a plurality of roll groups were continuously arranged, and was preliminarily heated on a preheat roll until the film temperature became 80° C. Then, the film was stretched to 3 times its original length between a low-speed stretching roll set at a surface temperature of 95° C. and a high-speed stretching roll in which circulating water was set at a temperature of 30° C., and wound, resulting in a film roll in which a biaxially stretched film (heat-shrinkable polystyrene film) with a thickness of about 30 μm was wound for a predetermined length. Subsequently, the properties of the resulting film were evaluated by the methods as described above. The evaluation results are shown in Table 3.

Example 2

A film roll in which a heat-shrinkable polystyrene film was wound was obtained by the same method as that of Example 1, except that the polystyrene material was changed to the above polystyrene 2. Then, the properties of the resulting film were evaluated by the same methods as that of Example 1. The evaluation results are shown in Table 3.

Example 3

A film roll in which a heat-shrinkable polystyrene film was wound was obtained by the same method as that of Example 1, except that the stretching ratio in the transverse direction in the tenter was changed to 5.0 times. The thickness of the heat-shrinkable polystyrene film was about 24 μm. Then, the properties of the resulting film were evaluated by the same methods as that of Example 1. The evaluation results are shown in Table 3.

Example 4

A film roll in which a heat-shrinkable polystyrene film was wound was obtained by the same method as that of Example 1, except that the temperature for the intermediate thermal relaxation treatment in the tenter was changed to 130° C. The thickness of the heat-shrinkable polystyrene film was about 30 μm. Then, the properties of the resulting film were evaluated by the same methods as that of Example 1. The evaluation results are shown in Table 3.

Example 5

A film roll in which a heat-shrinkable polystyrene film was wound was obtained by the same method as that of Example 1, except that the stretching ratio in the longitudinal direction in the lengthwise stretching machine was changed to 2.3 times. The thickness of the heat-shrinkable polystyrene film was about 39 μm. Then, the properties of the resulting film were evaluated by the same methods as that of Example 1. The evaluation results are shown in Table 3.

Example 6

A film roll in which a heat-shrinkable polystyrene film was wound was obtained by the same method as that of Example 1, except that the stretching ratio in the longitudinal direction in the lengthwise stretching machine was changed to 1.8 times. The thickness of the heat-shrinkable polystyrene film was about 50 μm. Then, the properties of the resulting film were evaluated by the same methods as that of Example 1. The evaluation results are shown in Table 3.

Comparative Example 1

An unstretched film was obtained by the same method as that of Example 1, except that the extruding amount of the extruder was adjusted such that the thickness of the unstretched film became about 150 μm. Then, a film roll in which a heat-shrinkable polystyrene film was wound was obtained by leading the resulting unstretched film to the lengthwise stretching machine without performing the transverse stretching and the intermediate thermal relaxation treatment, by lengthwise stretching the unstretched film similarly as in Example 1, and by winding the film. The thickness of the heat-shrinkable polystyrene film was about 50 μm. Then, the properties of the resulting film were evaluated by the same methods as that of Example 1. The evaluation results are shown in Table 3.

Comparative Example 2

A film roll in which a heat-shrinkable polystyrene film was wound was obtained by transversely stretching an unstretched film, obtained as in Example 1, similarly as in Example 1, by then leading the film to the lengthwise stretching machine without performing the intermediate thermal relaxation treatment, by lengthwise stretching the film similarly as in Example 1, and by winding the film. However, the decrease of the width during lengthwise stretching was marked, and a film with excellent flatness could not be obtained.

Comparative Example 3

A film roll in which a heat-shrinkable polystyrene film was wound was obtained by the same method as that of Example 1, except that the stretching ratio in the longitudinal direction in the lengthwise stretching machine was changed to 1.2 times. The thickness of the heat-shrinkable polystyrene film was about 75 μm. Then, the properties of the resulting film were evaluated by the same methods as that of Example 1. The evaluation results are shown in Table 3.

Comparative Example 4

A film roll in which a heat-shrinkable polystyrene film was wound was obtained by the same method as that of Example 1, except that the temperature for the intermediate thermal relaxation treatment was changed to 80° C. However, the decrease of the width during lengthwise stretching was marked, and a film with excellent flatness could not be obtained.

Comparative Example 5

A film roll in which a heat-shrinkable polystyrene film was wound was obtained by the same method as that of Example 1, except that the stretching ratio in the transverse direction in the tenter was changed to 2.0 times. The thickness of the heat-shrinkable polystyrene film was about 60 μm. Then, the properties of the resulting film were evaluated by the same methods as that of Example 1. The evaluation results are shown in Table 3.

TABLE 3

| | Hot-water shrinkage ratio (%) | | Orthogonal direction* | Maximum value of heat shrinkage stress (MPa) | Right angle tear strength (N/mm) | Elmendorf tear load (mN) | | Elmendorf ratio |
|---|---|---|---|---|---|---|---|---|
| | Main shrinkage direction | | | | | Main shrinkage direction | Orthogonal direction* | |
| | 80° C. | 90° C. | (90° C.) | | | | | |
| Example 1 | 50 | 57 | 8 | 6.2 | 100 | 41 | 107 | 0.40 |
| Example 2 | 51 | 58 | 7 | 5.7 | 105 | 47 | 103 | 0.46 |
| Example 3 | 55 | 60 | 6 | 5.9 | 98 | 53 | 100 | 0.53 |
| Example 4 | 50 | 57 | 5 | 5.9 | 100 | 52 | 120 | 0.43 |
| Example 5 | 38 | 45 | 8 | 5.5 | 106 | 75 | 166 | 0.45 |
| Example 6 | 31 | 35 | 8 | 5 | 110 | 146 | 230 | 0.63 |
| Comparative Example 1 | 58 | 63 | −23 | 6 | 230 | 130 | 410 | 0.32 |
| Comparative Example 2 | — | — | — | — | — | — | — | — |
| Comparative Example 3 | 12 | 17 | 12 | 4.3 | 110 | 215 | 135 | 1.59 |
| Comparative Example 4 | — | — | — | — | — | — | — | — |
| Comparative Example 5 | 49 | 55 | 10 | 5.9 | 130 | 68 | 180 | 0.38 |

| | Breaking energy (MPa · %) | | Shrinkage unevenness | Perforated line openability (failure ratio) (%) | Toughness |
|---|---|---|---|---|---|
| | Main shrinkage direction | Orthogonal direction* | | | |
| Example 1 | 1770 | 5380 | Excellent | 8 | Good |
| Example 2 | 1860 | 4870 | Excellent | 6 | Good |
| Example 3 | 2460 | 3320 | Excellent | 6 | Good |
| Example 4 | 1610 | 5580 | Excellent | 6 | Good |
| Example 5 | 3010 | 2010 | Excellent | 8 | Good |
| Example 6 | 3480 | 1220 | Excellent | 2 | Good |
| Comparative Example 1 | 1980 | 3731 | Poor | 16 | Good |
| Comparative Example 2 | — | — | — | — | — |
| Comparative Example 3 | 3950 | 520 | Poor | 14 | Poor |
| Comparative Example 4 | — | — | — | — | — |
| Comparative Example 5 | 830 | 5030 | Excellent | 8 | Poor |

Orthogonal direction*: Direction orthogonal to the main shrinkage direction

As is obvious from Table 3, the films obtained in Examples 1 to 6 were all high in shrinkability in the longitudinal direction that is the main shrinkage direction, very low in shrinkability in the width direction orthogonal to the main shrinkage direction, and high in breaking energy. In addition, the films obtained in Examples 1 to 6 had no shrinkage unevenness, and were excellent in finish properties after shrinkage, perforated line openability, and toughness. In other words, the heat-shrinkable polystyrene films obtained in Examples were all high in quality as a label and extremely high in practicality.

On the other hand, the heat-shrinkable film obtained in Comparative Example 1 had a hot-water heat shrinkage ratio in the width direction and a right angle tear strength which were out of the range of the present invention. Thus, unevenness in shrinkage occurred when the film was attached as a label, and the perforated line openability was poor. In addition, the heat-shrinkable film obtained in Comparative Example 3 had hot-water heat shrinkage ratios in the longitudinal direction and the width direction and a breaking energy (the width direction) which were out of the range of the present invention. Thus, unevenness in shrinkage occurred when the film was attached as a label, the perforated line openability was poor, and the toughness was also insufficient. Further, the heat-shrinkable film obtained in Comparative Example 5 had a breaking energy (the longitudinal direction) which was out of the range of the present invention, and thus the toughness of an attached label was insufficient.

Industrial Applicability

The heat-shrinkable polystyrene film of the present invention has excellent processing properties as described above, and thus can be suitably used for label applications for bottles.

BRIEF DESCRIPTION OF THE DRAWINGS

FIG. 1 is an explanatory view showing a shape of a test piece in the measurement of right angle tear strength (wherein, the unit of length in the drawing for each portion of the test piece is mm).

DESCRIPTION OF THE SYMBOL

F—film

The invention claimed is:

1. A heat-shrinkable polystyrene film formed in an elongated shape with a constant width from a polystyrene resin, a main shrinkage direction thereof being in a longitudinal direction,
the heat-shrinkable polystyrene film meeting the following requirements (1) to (4):
(1) the hot-water heat shrinkage ratio in the longitudinal direction is 25% or more and 80% or less when the film is treated in hot water at 90° C. for 10 seconds;
(2) the hot-water heat shrinkage ratio in a width direction orthogonal to the longitudinal direction is −5% or more and 10% or less when the film is treated in hot water at 90° C. for 10 seconds;
(3) the right angle tear strength in the width direction per unit thickness after the film is shrunk by 10% in the longitudinal direction in hot water at 80° C. is 50 N/mm or more and 200 N/mm or less; and
(4) each of the breaking energies in the longitudinal direction and the width direction is 1,000 MPa·% or more and 10,000 MPa·% or less when the film is kept at 30° C. for 2 weeks or longer and then a tensile test is performed at 23° C.

2. The heat-shrinkable polystyrene film according to claim 1, wherein the polystyrene resin includes an atactic polystyrene as a principal component.

3. The heat-shrinkable polystyrene film according to claim 1, wherein a material of the polystyrene resin is one obtained by copolymerization of: styrene that is a principal component; and at least one of a conjugated diene monomer, an acrylic ester, and a methacrylic ester.

4. The heat-shrinkable polystyrene film according to claim 3, wherein the copolymerization is random copolymerization.

5. The heat-shrinkable polystyrene film according to claim 3, wherein the copolymerization is block copolymerization.

6. The heat-shrinkable polystyrene film according to claim 3, wherein the copolymerization is graft copolymerization.

7. A method for manufacturing a heat-shrinkable polystyrene film of claim 1, the method comprising the steps of:
stretching an unstretched film at a ratio of 2.5 times or more and 6.0 times or less in the width direction at a temperature of Tg+5° C. or higher and Tg+40° C. or lower while holding both ends of the film in the width direction using clips within a tenter;
heat-treating the film at a temperature of 100° C. or higher and 170° C. or lower for a period of 1.0 second or longer and 30.0 seconds or shorter;
cutting and removing portions of the film at both ends in the width direction which are held by the clips; and
stretching the film at a ratio of 1.5 times or more and 5.5 times or less in the longitudinal direction at a temperature of Tg+5° C. or higher and Tg+50° C. or lower.

8. A method for manufacturing a heat-shrinkable polystyrene film of claim 2, the method comprising the steps of:
stretching an unstretched film at a ratio of 2.5 times or more and 6.0 times or less in the width direction at a temperature of Tg+5° C. or higher and Tg+40° C. or lower while holding both ends of the film in the width direction using clips within a tenter;
heat-treating the film at a temperature of 100° C. or higher and 170° C. or lower for a period of 1.0 second or longer and 30.0 seconds or shorter;
cutting and removing portions of the film at both ends in the width direction which are held by the clips; and
stretching the film at a ratio of 1.5 times or more and 5.5 times or less in the longitudinal direction at a temperature of Tg+5° C. or higher and Tg+50° C. or lower.

9. A method for manufacturing a heat-shrinkable polystyrene film of claim 3, the method comprising the steps of:
stretching an unstretched film at a ratio of 2.5 times or more and 6.0 times or less in the width direction at a temperature of Tg+5° C. or higher and Tg+40° C. or lower while holding both ends of the film in the width direction using clips within a tenter;
heat-treating the film at a temperature of 100° C. or higher and 170° C. or lower for a period of 1.0 second or longer and 30.0 seconds or shorter;
cutting and removing portions of the film at both ends in the width direction which are held by the clips; and
stretching the film at a ratio of 1.5 times or more and 5.5 times or less in the longitudinal direction at a temperature of Tg+5° C. or higher and Tg+50° C. or lower.

10. A method for manufacturing a heat-shrinkable polystyrene film of claim 4, the method comprising the steps of:
stretching an unstretched film at a ratio of 2.5 times or more and 6.0 times or less in the width direction at a temperature of Tg+5° C. or higher and Tg+40° C. or lower while holding both ends of the film in the width direction using clips within a tenter;
heat-treating the film at a temperature of 100° C. or higher and 170° C. or lower for a period of 1.0 second or longer and 30.0 seconds or shorter;
cutting and removing portions of the film at both ends in the width direction which are held by the clips; and
stretching the film at a ratio of 1.5 times or more and 5.5 times or less in the longitudinal direction at a temperature of Tg+5° C. or higher and Tg+50° C. or lower.

11. A method for manufacturing a heat-shrinkable polystyrene film of claim 5, the method comprising the steps of:
stretching an unstretched film at a ratio of 2.5 times or more and 6.0 times or less in the width direction at a temperature of Tg+5° C. or higher and Tg+40° C. or lower while holding both ends of the film in the width direction using clips within a tenter;
heat-treating the film at a temperature of 100° C. or higher and 170° C. or lower for a period of 1.0 second or longer and 30.0 seconds or shorter;
cutting and removing portions of the film at both ends in the width direction which are held by the clips; and
stretching the film at a ratio of 1.5 times or more and 5.5 times or less in the longitudinal direction at a temperature of Tg+5° C. or higher and Tg+50° C. or lower.

12. A method for manufacturing a heat-shrinkable polystyrene film of claim 6, the method comprising the steps of:
stretching an unstretched film at a ratio of 2.5 times or more and 6.0 times or less in the width direction at a temperature of Tg+5° C. or higher and Tg+40° C. or lower while holding both ends of the film in the width direction using clips within a tenter;
heat-treating the film at a temperature of 100° C. or higher and 170° C. or lower for a period of 1.0 second or longer and 30.0 seconds or shorter;
cutting and removing portions of the film at both ends in the width direction which are held by the clips; and
stretching the film at a ratio of 1.5 times or more and 5.5 times or less in the longitudinal direction at a temperature of Tg+5° C. or higher and Tg+50° C. or lower.

* * * * *